(12) United States Patent
Willimann et al.

(10) Patent No.: US 6,559,236 B1
(45) Date of Patent: May 6, 2003

(54) METHOD FOR PRODUCING AQUEOUS DISPERSIONS OF (CO)POLYMERS, DISPERSIONS OBTAINED USING SAID METHOD, REDISPERSIBLE POWDERS WHICH CAN BE OBTAINED FROM SAID DISPERSIONS AND USE THEREOF

(75) Inventors: Hongli Willimann, Merenschwand (CH); Robert Koelliker, Oberkirch (CH)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 09/744,089

(22) PCT Filed: Jul. 21, 1999

(86) PCT No.: PCT/EP99/05206

§ 371 (c)(1),
(2), (4) Date: May 11, 2001

(87) PCT Pub. No.: WO00/05283

PCT Pub. Date: Feb. 3, 2000

(30) Foreign Application Priority Data

Jul. 22, 1998 (DE) ......................... 198 33 066

(51) Int. Cl.[7] ............................ C08F 271/00; C08L 9/04
(52) U.S. Cl. .................... 525/293; 524/458; 524/457; 524/460; 524/564
(58) Field of Search ................ 524/458, 457, 524/460, 464; 525/293

(56) References Cited

U.S. PATENT DOCUMENTS

| 4,483,959 | A |   | 11/1984 | Maslanka et al. ........... 524/457 |
| 5,288,782 | A | * | 2/1994  | Nakajima et al. ........... 524/272 |
| 5,403,894 | A |   | 4/1995  | Tsai et al. .................... 525/285 |
| 5,925,447 | A | * | 7/1999  | Gust et al. ................... 428/323 |
| 6,011,103 | A | * | 1/2000  | Inoue .......................... 524/458 |

FOREIGN PATENT DOCUMENTS

| EP |   0 630 909   | 12/1994 | ............ C08F/2/06 |
| WO | WO 96 41825   | 12/1996 | ......... C08F/257/02 |

* cited by examiner

Primary Examiner—James J. Seidleck
Assistant Examiner—Olga Asinovsky
(74) Attorney, Agent, or Firm—Thomas F. Roland, Esq.

(57) ABSTRACT

Process for the preparation of aqueous dispersions of (co) polymerizates using a polymer with cationic functionality, optionally accompanied by the use of conventional additives, the polymer with cationic functionality being obtained by (co)polymerization in an aqueous medium of olefinically unsaturated (co)monomers, in which at least one (co)monomer has a cationic functionality, further (co) monomers are added and polymerization takes place in the presence of suitable initiators, wherein the polymers and/or (co)monomers are so chosen and the process is so controlled that a (co)polymerizate particle with heterogeneous morphology is formed and the dispersed (co)polymerizate obtained has a glass transition temperature Tg of more than about 50° C. The invention also relates to a process in which the polymer with cationic functionality is formed in situ in the presence of a seed. Redispersible powders and the use thereof are also described.

19 Claims, No Drawings

US 6,559,236 B1

METHOD FOR PRODUCING AQUEOUS DISPERSIONS OF (CO)POLYMERS, DISPERSIONS OBTAINED USING SAID METHOD, REDISPERSIBLE POWDERS WHICH CAN BE OBTAINED FROM SAID DISPERSIONS AND USE THEREOF

FIELD OF THE INVENTION

BACKGROUND OF THE INVENTION

The present invention relates to processes for the preparation of aqueous dispersions of (co)polymerizates using a polymer with cationic functionality and optionally using conventional additives. The invention also relates to the aqueous dispersions preparable with the processes according to the invention, dispersible powders obtainable from the dispersions, as well as the use thereof.

The stabilization of aqueous polymer dispersions (latices) is known from the prior art. Unlike polymer solutions, aqueous polymer dispersions are not thermodynamically stable systems. For this reason to the dispersions are generally added dispersing agents, which have an interfacial stabilizing action. In general, they are water-soluble compounds, present either in the form of protective colloids or emulsifiers. Due to their amphiphilic structure emulsifiers, which usually have a molecular weight below 1500, have a stabilizing action by reducing the interfacial tension between the polymerizate and the aqueous dispersing medium. The stabilizing action of protective colloids is mainly based on a steric shielding of the dispersed particles. They are generally substances with a molecular weight above 1500 and they can be both chemically and physically bound to the dispersed particles. In the widest sense, said protective colloids are themselves polymeric materials, which can therefore impair the action of the modifying polymerizate.

Such stabilizers, which can also be used in emulsion polymerization, are e.g. conventional surfactants, water-soluble polymers, such as polyvinyl alcohol or polyvinyl pyrrolidone, as well as polymerizable monomers. Such polymerizable, functional monomers, which can be used in polymerized form as a substitute for conventional surfactants, are e.g. carboxyl monomers, acrylamides or polymerizable surfactants with sulphonate groups.

A problem when using stabilizing agents is the coalescence, i.e. the undesired flowing together of the latex particles in the emulsion, so that it is no longer possible to obtain a redispersible powder. This agglomeration to larger polymerizate secondary particles (coagulate), for a given polymerizate content of the aqueous dispersion, becomes all the more critical the more finely divided the particles in the disperse distribution, because the interface grows superproportionally with decreasing particle diameter.

Apart from stabilized, aqueous polymerizate dispersions, great significance is in particular attacked to powders rendered available by drying from these dispersions. Redispersible powders are advantageous due to their easy handling, the easier, space-saving transportation, the easier dosability and the less expensive storage. As a result of the readily available dispersing medium (water) the powder form is also desirable in this respect.

The polymer powders produced by drying processes, such as e.g. freeze or spray drying, where in particular in the case of spray drying larger powder quantities can be produced, should be completely reversibly dispersible. However, when adding water, generally not completely satisfactory results are obtained. This is due to the fact that on drying, the highly disperse particles in the dispersion necessarily approach one another until in the case of contact of the surfaces of the particles irreversible changes occur, such as the aforementioned coalescence or also an aggregation of the particles. As a result the surface characteristics of the disperse phase are modified in such a way that on adding water, the affinity of the particles for one another is greater than that to water, so that there is no real redispersion.

In addition, the aforementioned emulsifiers or protective colloids, such as e.g. polyvinyl alcohol, can lead to a reduction of the reactivity of the redispersed polymer particles. In other words, the redispersible powder, following dispersion again, can partly or entirely lose its reactivity, together with the characteristics associated therewith.

One possibility of preventing an irreversible change to the external form of the aqueous polymer dispersion after drying consists of the addition of so-called drying aids, which are also known as spraying aids. These drying aids are water-soluble substances, which on drying form a matrix and in this way embed the polymer particles. On redispersing with water the matrix dissolves again and the polymer particles are reobtained in a virtually unchanged form. EP 770 640 A2 makes use of such a procedure. It describes the preparation of polymerizate powders by drying aqueous polymerizate dispersions, the dispersed polymerizates, which have a positive or negative surface charge, being maintained in solution, accompanied by the addition of a drying aid. This drying aid is a polyelectrolyte, which dissociates into a polyion and a counterion, in which the counterion must have the opposite charge to the polymerizate surface charge. Therefore the polyelectrolyte fulfils the function of an additional stabilizer, which keeps the polymerizate in solution. The polymerizate is not polymerized in the presence of the stabilizer, but is instead present as a finished polymer. The stabilizing effect is here achieved by a further molecule virtually acting as an emulsifier.

Another possibility for obtaining stabilized dispersions from a water-insoluble latex is known from EP 441 037 A1. The latter describes anionically stabilized dispersions from latex and a quaternary, cationic polymer, both components being separately preparable and storable as soluble polymers. Both components are then sprayed together onto the application surface, in order to form a dry coating which cannot be washed out, the cationic polymer serving as a coagulant. Therefore the cationic polymers do not contribute to the stabilization of the dispersion and instead destroy the same, accompanied by the precipitation of the latex polymers (so-called demulsification) and formation of a coating.

EP 286 008 B1 describes the use of aqueous, cationic plastic dispersions for impregnating and priming absorbent substrates. The cationic dispersion polymerizates contain 80 to 99 wt. % ethylenically unsaturated monomers from the group vinyl esters, methacrylic esters, acrylic esters, vinyl aromatics, vinyl chloride, ethylene, acrylonitrile, diesters of maleic acid and/or fumaric acid and vinyl pyrrolidone, 1 to 20 wt. % ethylenically unsaturated, cationic, water-soluble monomers, 0 to 19 wt. % ethylenically unsaturated, hydrophilic monomers with one or more functional groups from the series COOH, —NR$^1$R$^2$, —CONR$^1$R$^2$, in which R$^1$ and R$^2$ stand for H or —CH$_2$OR with R═H or (C$_1$–C$_8$)-alkyl, and up to 19 wt. % ethylenically unsaturated monomers with one or more OH groups. The monomers are chosen in such a way that the minimum cationic activity of the dispersions is 20 to 200 μmole/g solids, 15- measured at pH 7 and 60 to 99% of the cationic charge is on the surface of the particles, and the dispersions have a minimum film formation temperature (MFT) between 0 and 40° C. The polymerizate particles of the dispersions have an average particle diameter of 0.02 to 0.2 μm. The cationic dispersions are used for impregnating and priming brickwork, concrete, plaster surfaces, ground plaster, gypsum surfaces or bricks. However, dispersible powders are not described.

SUMMARY OF THE INVENTION

According to JP 55-104 955 A, an aqueous dispersion of a cationic-ethylenically unsaturated polymer is described, which has a glass transition temperature Tg<50° C. and contains a cationic, water-soluble or water-dispersible, ethylenically unsaturated oligomer and/or polymer and/or cationizable, ethylenically unsaturated monomers in aqueous phase. The polymers serve as additives for improving the characteristics of cement products. As a result there is an improvement to the water resistance, water tightness, strength, adhesion, chemical stability and durability of a cement product, such as mortar. The emulsion polymerization of these polymers is either brought about by radical polymerization of alpha or beta-ethylenically unsaturated monomers in the presence of cationic, water-soluble and/or water-dispersible oligomers and/or polymers or by radical polymerization of alpha or beta-ethylenically unsaturated monomers, which are in part replaced by cationic, ethylenically unsaturated monomers, such as dimethylaminoethyl methacrylate esters of maleic acid, fumaric acid, itaconic acid, etc. This teaching is disadvantageous in that the polymers which can be used are very restricted and there is also a very restricted field of use for the cement formulations. In addition, the polymers produced must have a glass transition temperature Tg<50° C., in order to e.g. give mortars the desired characteristics.

DESCRIPTION OF THE INVENTION

In addition, the cationic acrylic resin according to this Japanese patent serves as a water dispersing agent and is used as an additional additive. The use of the cationic, water-soluble or water-dispersible oligomer and/or polymer is used for preventing coagulation of the latex in the cement. Moreover, JP 55 104 955 A does not describe a redispersible powder and the latter is also not provided. It is therefore much more difficult to provide, in addition to a stable dispersion, a redispersible powder obtainable therefrom.

The problem of the invention is to so further develop the aqueous dispersions prepared according to the aforementioned processes the whilst maintaining advantageous characteristics or in individual cases for producing improved characteristics, the performance of the process and the choice of the starting materials can be made more flexible. Independently of the functionality of the polymers to be dispersed, the process must also reliably stabilize them in aqueous dispersion. The said dispersions must also be improved so that in their final applications, such as e.g. in plastic-containing, cement-bound systems, they lead to improved use products due to desired consecutive reactions. It must also be possible to obtain from the dispersions a redispersible powder, which substantially maintains its advantageous characteristics, following redispersion in the aqueous medium. It must be possible to obviate the use of stabilizing additives in the form of emulsifiers and protective colloids, as well as drying or spraying aids.

According to the invention, the aforementioned problem is solved by a process A) for the preparation of aqueous dispersions of (co)polymerizates using a polymer with cationic functionality, optionally accompanied by the use of conventional additives, the polymer with cationic functionality being obtained by (co)polymerization in an aqueous medium of olefinically unsaturated (co)monomers, in which at least one (co)monomer has a cationic functionality, further (co)monomers are added and polymerization takes place in the presence of suitable initiators, wherein the polymers and/or (co)monomers are so chosen and the process is so controlled that a (co)polymerizate particle with heterogeneous morphology is formed and the dispersed (co)polymerizate obtained has a glass transition temperature Tg of more than about 50° C.

Surprisingly, the polymers with cationic functionality have an action corresponding to an emulsifier or protective colloid for the (co)polymerizate formed according to the invention and during emulsion polymerization lead to a stabilization of the dispersed, copolymerized particles. Through a type of "polymerizing in" of the polymer with cationic functionality, a dispersion-stable latex particle is produced, the latex particles prepared according to process A) having a heterogeneous morphology. In this context, "heterogeneous morphology" need not mean that necessarily two or more different glass transition temperatures Tg must be present. In fact, it means that in the (co)polymerizate particles areas with different compositions, i.e. for example phases, are formed. According to the invention, e.g. an inverse core-shell morphology can be formed. The (co)polymerizate particle can essentially have an outer phase (shell) in the form of substantially hydrophobic areas and an inner phase (core) in the form of substantially hydrophilic areas. Alternatively, with the inventive process, a so-called raspberry-like structure can be produced. Obviously mixed forms with heterogenous morphology are obtainable. Preferably, the emulsion polymerization is performed in such a way that the proportion of polymer with cationic functionality is greater in the outer phase than in the inner phase. The parameters and conditions variable in this connection are known to the expert and reference is made in this respect to "emulsion polymerization and emulsion polymers", P. A. Lovell and M. S. El-Aasser, 1997, particularly pp 293–326.

In the case of the core-shell morphology obtained according to the invention, once again the glass transition temperature can be very important. The glass transition temperature can either be determined by measurement, e.g. using DSC methods, or by theoretical calculation. Within the scope of the present invention, the glass transition temperatures (midpoint temperature according to ASTM D3418-82) of copolymers are calculated by a trial and error method according to Fox (T. G. Fox, Bull. Am. Phy. Soc. (ser II) 1,123 (1956) and Ullmann's Enzyklopädie der Technischen Chemie, vol. 19, 4th edition, Verlag Chemie, Weinheim, 1980, pp 17/18). Thus, for the glass transition temperature is obtained:

$$\frac{1}{Tg} = \frac{w_A}{Tg_A} + \frac{w_B}{Tg_B} + \ldots \frac{w_n}{Tg_n}$$

in which $W_A + W_B + W_C \ldots = 1$ and $W_A$, $W_B$ . . . represent the mass fractions of the monomers a, b . . . and $Tg_A$, $Tg_B$ . . . the glass transition temperatures of the corresponding copolymers. The glass transition temperatures of certain homopolymerizates of the aforementioned monomers are known and are e.g. listed in Ullman's Encyclopedia of Industrial Chemistry, VCH, Weinheim, vol. A21 (1992), p 169.

The polymers and/or (co)monomers are chosen in such a way that the dispersed (co)polymerizate obtained has a glass transition temperature Tg of more than about 50° C. As is known, the glass transition temperature can be controlled by the choice and quantity of the monomers used. The expert is aware of the criteria for adjusting the glass transition temperature to be applied within the scope of the process according to the invention, so that there is no need for further explanations here. The glass transition temperature Tg of the inner phase (core) and the outer phase (shell) can in each case be modified, in order to permit adaptation to the desired use. If a very rapid film formation is desired, then preferably the inner phase has a very low Tg value, preferably below 50° C., so that there is a coalescence of the latex particle. This is advantageous if a continuous dispersion film is to be prepared, which is e.g. the case with coating applications.

If no rapid film formation is to take place at ambient temperature, the glass transition temperature Tg is above 50° C. This can be important in corresponding applications, because as a result the stability of the redispersible powders is increased and higher mechanical characteristics of the final application can be obtained.

According to a preferred embodiment, the Tg value of the outer phase is as high as possible and simultaneously the Tg value of the inner phase is as low as possible. It is particularly advantageous if the outer phase has a glass transition temperature Tg of more than about 50° C. and the inner phase a temperature of less than about 50° C., particularly between about −70 and +50° C. This leads to particularly favourable characteristics, because the outer phase gives the sprayed powder an increased stability and the inner phase films the product after redispersion.

The expression "polymer with cationic functionality" is not particularly restricted, provided that it is obtained by (co)polymerization in aqueous medium of olefinically unsaturated (co)monomers and at least one cationic function is present in the molecule. The term "polymer" covers homopolymers, copolymers, block polymers, graft copolymers, as well as oligomers. It is obvious to the expert that any (co)polymerizable starting monomers with olefinically unsaturated functionalities can be used for this polymer. Preferably, in the polymer with catabolic functionality, for about one part by weight monomer with cationic functionality there are 0 to about 50 parts by weight, particularly about 0.1 to 20 parts by weight of (co)monomer.

The polymer results from co polymerizable, olefinically unsaturated compounds, which are e.g. a vinyl ester of ($C_1$–$C_{18}$) carboxylic acids, e.g. vinyl acetate, vinyl propionate, etc.; a (meth)acrylate of ($C_1$–$C_8$) alcohols, e.g. methyl methacrylate, butyl methacrylate, octyl methacrylate, ethyl acrylate, isobutyl acrylate, 2-ethyl hexyl acrylate; a vinyl aromatic, such as e.g. styrene, vinyl toluene, vinyl chloride, an ethylene, an acrylonitrile, a diester of maleic acid and/or fumaric acid, a vinyl pyrrolidone, an amino acrylate or methacrylate ester, a vinyl pyridine, an alkylamino group-containing vinyl ether, an alkylamino group-containing acrylamide/methacrylamide or a quaternary ammonium group-containing monomer, such as 2-hydroxy-3-acrylopropyl dimethyl ammonium chloride or 3-methacryloxypropyl dimethyl ammonium chloride or the like. Preferably the cationic functionality is attributed to a quaternary ammonium group. Preferably acrylates and/or methacrylates, as well as ester and amide compounds are used. The chain length between ester/amide and the quaternary nitrogen is typically $C_2$ to $C_4$. It is also possible to use amines protonated in the acid pH-range. According to the invention, particularly preferred monomers for the preparation of the polymer with cationic functionality are e.g.: N,N-[(3-chloro-2-hydroxypropyl)-3-dimethyl ammonium propyl]-methacrylamide chloride (DMA-PMA-epi), N-[3-(dimethylamino)-propyl]-methacrylamide hydrochloride (DMAPMA-HCl), N-[3-(trimethylammonium)-propyl]-methacrylamide chloride (MAPTAC), 2-hydroxy-3-methacryloxypropyl-triethyl ammonium chloride, dimethyl diallyl ammonium chloride, aziridinyl ethyl methacrylate, morpholinoethyl methacrylate, trimethyl ammonium ethyl-methacrylate chloride, dimethylaminopropyl methacrylate, 1,2,2,6,6-pentamethylpiperidinyl methacrylate, aminopropyl vinyl ether, diethylaminopropyl ether and tert-butylaminoethyl methacrylate.

According to the invention, the polymer with cationic functionality can either be prepared in a preceding stage by homo or (co)polymerization of monomers with cationic functionality or with further comonomers and immediately, without being isolated, further processed (in situ further processing). Alternatively the polymer with cationic functionality can firstly be separately prepared and then isolated prior to further processing according to the invention. It is obviously possible to use any commercially obtainable polymer with cationic functionality, which fulfils the aforementioned conditions.

Preferably, in the (co)polymerizate obtained, for about one part by weight monomer (with cationic functionality) of the polymer with cationic functionality, there are about 2 to 250 and in particular about 10 to 150 parts by weight of remaining (co)monomers. According to the invention, the (co)polymerizate prepared contains about 0.001 to 50 mole %, particularly about 0.1 to 35 mole % of monomer units with cationic functionality.

There are no particular restrictions in the present invention with regards to the choice of the (co)monomers, which are polymerized in the presence of the cationic polymer. It is possible to use all (co)polymerizable monomers known to the expert. Reference is made in exemplified manner to alpha, beta-ethylenically unsaturated monomers, such as acrylate esters, methacrylate esters and carboxylate esters, acids and their salts, such as acrylic acid, maleic acid, itaconic acid, vinyl sulphonic acid, vinyl toluene sulphonic acid and unsaturated, dibasic acids, their semi-esters and salts, alpha, beta-unsaturated amides, vinyl esters, vinyl-substituted, aromatic compounds, heterocyclic compounds with vinyl groups, vinylidene halides, alpha-olefins, diallyl phthalates, divinyl benzenes, alkyl acrylates, trimethylol propane trimethyl acrylates, esters of acrylic and methacrylic acid with methanol, ethanol, propanol, butanol, styrenes, alcohols, polyols, glycidyl alcohols, glycols and polycarboxylic acids.

Preferably, apart from cationic monomers, also monomers can be copolymerized, whose protonated, reactive group or groups are deprotonated, accompanied by a corresponding rise in the pH-value. Such groups are known to the experts. Apart from a cationic functionality, there can be at least one anionic functionality in the (co)monomers. Thus, amphoteric systems are obtained, which are stable as such and do not coagulate. These surprising characteristics are not known in this form in the prior art.

The process A) according to the invention can be performed continuously, semicontinuously or as a batch process. This is dependent on whether the polymer with cationic functionality is prepared separately or is further processed immediately following in situ preparation. For example, following the preparation of the cationic polymer, the process can be performed batchwise. In addition, it is clear to the expert that for performing inventive process A), due attention must be paid to the basic rules of emulsion polymerization. Thus, e.g. radical initiators are used for performing the polymerization. There is no relevant restriction to the invention in the choice of initiators. The radical initiators to be used in the invention are either water-soluble or water-insoluble, i.e. they are then monomer-soluble. Suitable water-soluble initiators are sodium, potassium and ammonium peroxodisulphate, hydrogen peroxide and water-soluble azo compounds such as 2,2'-azobis(2-amidino-propane dihydrochloride), 2,2'-azobis[2-methyl-N-(2-hydroxyethyl)-propion-amide] and 2,2'-azobis[2-(2-imadazolin-2-yl)-propane]-dihydrochloride. Suitable monomer-soluble initiators are organic hydroperoxides, such as tert-butyl hydroperoxide, pinane hydroperoxide, p-menthane hydroperoxide, cumene hydroperoxide and diisopropyl phenyl hydroperoxide, organic peroxides, such as dibenzoyl peroxide, dilauryl peroxide and diacetyl peroxide, as well as monomer-soluble azo compounds, such as azoisobutyronitrile. It is also possible to use mixtures of initiators.

In place of a radical initiator it is also possible to use an initiator system, which comprises a radical initiator of the aforementioned type and a water-soluble reducing agent. Thus, the actual radical initiator is formed during polymerization, which is e.g. possible by thermal decomposition of the aforementioned initiator, as well as by the reaction of the initiator with an aqueous reducing agent. The water-soluble reducing agents act as activators for the initiators. Suitable reducing agents are ascorbic acid, sodium, potassium and ammonium sulphite, bisulphite and metabisulphite, sodium formaldehyde sulphoxylate, tartaric acid, citric acid and glucose. They can be used in combination with a heavy metal salt. The reducing agents are generally used in a quantity of 0.01 to 2 wt. %, based on the total monomers added and are usually dosed in during polymerization. The initiators or initiator combination are generally used in a quantity of 0.01 to 2 wt. %, based on the total monomers. Particular preference is given to 2,2'-azobis (2-amidinopropane)-dihydrochloride, hydrogen peroxide and tert-butyl hydroperoxide combined with a reducing agent, e.g. sodium formaldehyde sulphoxylate.

As a function of the use conditions, it is concomitantly possible to use conventional additives. Examples are thickening agents, pigments, flame-proofing substances, crosslinkers, fillers, reinforcing agents, film formation aids, antioxidants, fungicides, foam inhibitors, plasticizers, preservatives, wetting agents, rheology modifying aids, vulcanizing agents, resins, adhesion aids, antiblocking agents, etc., which can be added in conventional quantities.

According to the invention, the dispersion is preferably prepared without emulsifier addition, but it is optionally possible to use a small quantity of emulsifier. The emulsifier quantity is appropriately below about 3 wt. %, particularly below about 1.5 wt. %. The emulsifier proportion is preferably under 1 wt. %, in particularly preferred manner below 0.5 wt. % or more especially below 0.2 wt. %.

Polymerization is preferably performed between about 50 and 100° C., particularly between about 60 and 90° C. The temperature can e.g. be dependent on the initiator system used. In certain cases the starting temperature is preferably about 70° C. The heat evolution due to the exothermic reaction during polymerization can be used in order to adjust the reaction temperature between 80 and 90° C. and optionally it may be necessary to cool so as not to exceed the indicated temperature range. All the amount of heat produced can also be dissipated, so as to maintain the starting temperature of about 70° C. throughout the reaction or even to drop below the same. In some cases it is possible to work in an autoclave, which offers the possibility of performing polymerization above 100° C. During the radical, aqueous emulsion polymerization, the pH-value of the aqueous dispersing medium is generally 2 to 10. After the end of polymerization, the pH-value can be adjusted to about 2 to 12.

The present invention also relates to a process B) for the preparation of aqueous dispersions of (co)polymerizates using a polymer with cationic functionality, optionally accompanied by the addition of conventional additives, in which the polymer with cationic functionality is obtained by (co)polymerization in an aqueous medium of olefinically unsaturated (co)monomers, in which at least one (co) monomer has a cationic functionality, further (co)monomers are added and polymerization takes place in the presence of suitable initiators, the polymer with cationic functionality being formed in situ in the presence of a seed.

Surprisingly the characteristics of these polymers with cationic functionality are comparable with those of emulsifiers or protective colloids with regards to the (co) polymerizate formed according to the invention, so that the copolymerized particles are stabilized in dispersion. Through a type of "polymerizing in" of the polymer with cationic functionality, a dispersion-stable latex particle is produced, but process B) is directed to a seed polymerization.

In seed polymerization, which is particularly suitable for producing monodisperse latices, a latex with a uniform particle size is initially used. To this seed latex are then dosed in the monomers to be polymerized using a monomer charging procedure. Polymerization is carried out in such a way that the previously introduced latex particles, increase in volume, but do not grow quantitatively, accompanied by the obtaining of monodispersity of the system. The number of particles is proportional to the amount used beforehand and a narrow particle size distribution is obtained. According to the invention, for forming the seed about 0.1 to 25 and in particular about 0.5 to 20 wt. % of the (co)monomer, based on the finished (co)polymerizate are used. The (co) monomers can be the monomers used for the preparation of the cationic polymer or any other monomer (foreign latex). The monomers for preparing the seed are generally independent of the subsequently used monomers.

The (co)polymerizate particles prepared according to the invention by means of the preceding seed polymerization have an extremely homogeneous particle size, i.e. the particles are (substantially) monodisperse. In this context, "monodisperse" means that the average particle diameter preferably varies by about ±10%. Such homogeneous particle sizes are not always possible with the prior art processes or are frequently associated with high process engineering costs and low yields. In process B) according to the invention, the particle size of the (co)polymerizate produced can be adjusted in planned manner. The latex particles formed preferably have an average diameter of about 30 to 1000 nm, particularly about 50 to 600 nm.

The polymer with cationic functionality can be both a homopolymer, copolymer, block polymer or graft copolymer or also an oligomer and is subject to no other restriction, provided that the cationic polymer has resulted from the (co)polymerization of olefinically unsaturated monomers and has at least one cationic functionality. Reference is made to the examples for process A) with regards to monomers with cationic functionality suitable for preparing the polymer. Preferred monomers with cationic functionality are also quaternary ammonium group-containing monomers. It is obvious to the expert that any (co)polymerizable, olefinically unsaturated starting monomers can be used for this polymer. Preferably, in the polymer with cationic functionality, for about 1 part by weight monomer with cationic functionality there are 0 to about 50 and in particular about 0.1 to 20 parts by weight of (co)monomer.

Thus, according to the invention, the polymer with cationic functionality is prepared by seed polymerization in a preceding stage by homo or (co)polymerization of olefinically unsaturated (co)monomers, in which at least one (co)monomer has a cationic functionality, and is immediately, without being isolated, further processed (further processing in situ). Alternatively the polymer with cationic functionality can be firstly prepared independently of the inventive process, isolated and then further processed. Obviously it is possible to use any commercially available polymer with cationic functionality, which fulfils the aforementioned conditions. Preferably, in the (co)polymerizate obtained, for about 1 part by weight monomer (with cationic functionality) of the polymer with cationic functionality, there are about 2 to 250 and in particular about 10 to 150 parts by weight of other (co)monomers. According to the invention, the (co)polymerizate prepared can contain about 0.001 to 50 mole %, particularly about 0.1 to 35 mole % monomer units with cationic functionality.

With regards to the choice of the (co)monomers, which are polymerized in the presence of the cationic polymer, there are no relevant restrictions to the invention. All (co) polymerizable monomers known to the expert can be used. Reference is made to the comonomers listed for process A) for examples of usable comonomers.

It is preferred that the polymers and/or (co)monomers are selected in such a way that the dispersed (co)polymerizate obtained has a glass transition temperature Tg of more than about 50° C. In this connection it is referred to process A).

In a preferred aspect, apart from cationic monomers, it is also possible to copolymerize monomers, whose protonated, reactive group or groups, are deprotonated, accompanied by a corresponding rise in the pH-value. In addition to a cationic functionality, the (co)monomers can have at least one anionic functionality. As a result amphoteric systems can be obtained, which are present in stable form and do not coagulate. Such groups are known to the expert.

As a function of whether the polymer with cationic functionality is prepared separately or in in situ, process B) according to the invention can be performed continuously, semicontinuously or as a batch process and obviously account must be taken of the principles of an emulsion polymerization. In the case of in situ further processing of the cationic polymer, the process can e.g. be performed continuously or as a batch process. The polymerization is carried out in conventional manner between about 50 and 100° C., particularly between about 60 and 90° C. The temperature can e.g. be dependent on the initiator system used. It is also possible to use here radical initiators, either singly, or as a mixture or optionally with suitable activators, which correspond to those used in illustrating process A). The initiators or initiator combinations are generally used in a quantity of 0.01 to 2 wt. %, based on the total monomers.

As a function of the intended use, the conventional additives known to the expert can be added in suitable quantities. However, the use of emulsifiers is largely obviated, the emulsifier quantity being appropriately below about 3 wt. %, or below about 1.5 wt. %, preferably below 1 wt. %, in particularly preferred manner below 0.5 wt. % or more especially below 0.2 wt. %.

The object of the invention also covers the stabilized, aqueous dispersions obtainable according to the above-described processes A) or B). These are in particular characterized by their high stability and the flexibility of the starting materials.

According to a preferred embodiment of the invention the obtained aqueous dispersion (dispersion 1) of one kind of latex particles can be mixed with a further aqueous dispersion (dispersion 2) with other latex particles. The weight ratio of dispersion 1 to dispersion 2 is preferably in the range of about 5:95 to 95:5, particularly about 10:90 to 90:10, especially about 20:80 to 80:20. Dispersion 2 can comprise an aqueous dispersion of homopolymers or copolymers. Examples of monomers are vinyl acetate, ethylene, vinyl versatate, acrylate, methacrylate, styrene and/or butadiene. Obviously further monomers can also be used which are known by the expert in this technical field. By adding a further dispersion the properties can be optimized accordingly.

The invention also relates to redispersible powders, obtainable from the aforementioned aqueous dispersions after removing the water. Water removal takes place in conventional manner by drying, particularly by spray or freeze drying. Preferably, the redispersible powder according to the invention contains a (co)polymerizate of about 0.01 to 50 wt. % cationic monomers and about 50 to 99.99 wt. % (co)monomers. It is optionally possible to add about 0 to 5 wt. % emulsifiers and conventional additives.

The redispersible powder can be used as a pulverulent finished mixture, which need merely be stirred with water. As a function of the desired application, it can be redispersed in water in more or less concentrated form.

With particular advantage in the present invention, it is possible to achieve a high solids content in the dispersion prepared, a dispersion with up to about 75% solids content in the aqueous medium being possible. Appropriately, generally an aqueous dispersion with about 20 to 60%, particularly about 30 to 50% solids content is prepared.

By mixing a further powder to the obtained powder of the present invention the properties can be optimized accordingly. Thus, powder 1 of one kind of latex particles can be admixed with a further powder 2 of other latex particles. Preferably the weight ratio of powder 1 to powder 2 is in the range of about 5:95 to 95:5, preferably about 10:90 to 90:10, particularly about 20:80 to 80:20. Powder 2 can comprise homopolymers or copolymers which are selected from the following monomers: vinyl acetate, ethylene, vinyl versatate, acrylate, methacrylate, styrene and/or butandiene. This listing is only exemplary and not limiting at all any other monomer can be used herein.

EXAMPLES

The aqueous dispersion and redispersible powder according to the invention can be used in many different ways. Thus, dispersion according to the invention are suitable for use in composite and coating mortars, cement dyes and adhesives, plastics-containing, cement-bound systems, particularly in mortars and plastics-bound, cement-free binders, particularly in cement-free mortars, gypsum mortars, primers, plasters, carpet, wood, powder and floor adhesives, as well as in wallpaper pastes, disperse powdered dyestuffs and glass fibre composite systems.

These inventive, aqueous (co)polymerizate dispersions and the redispersible (co)polymerizate powders obtainable therefrom by drying are particularly suitable for modifying cement building adhesives and for increasing the water resistance. Apart from a preferred use in tile adhesives, a use in cement-containing products of a general nature is possible. Based on the cement, the (co)polymerizate is usually added in a quantity of 3 to 30 wt. %, advantageously 7 to 20 wt. %. Typically such modified mortars contain 50 to 85 parts by weight sand (arithmetic mean of the particle size diameter in the range 0.1 to 0.3 mm), 15 to 40 parts by weight cement and (co)polymerizate in the weight ratio polymer/cement 0.03 to 0.30. It is obviously possible to add, as required, various additives such as cellulose, fibres, etc.

In particular, the (co)polymerizates in the form of redispersible powder prepared on the basis of seed polymerization are suitable as a filling material for columns in chromatographic separation processes, such as gas chromatography or high pressure liquid chromatography (HPLC) and as calibrating material for particle size measuring instruments, because, as a result of the preparation process, the particles have a substantially identical diameter, i.e. are homogeneous or monodisperse.

Inventive redispersible powders can also be used as carriers for the delayed release of substances of all types. The substances can be supplied either by polymerizing in the (co)polymerizate particles or by adding during redispersion of the particles. The substance obtained can then be released in delayed form, which can e.g. take place by adding or introducing in a substance-dissolving medium. The substances used can be employed in agriculture, e.g. as fungicides, herbicides, phytohormones, insecticides, nematicides, rodenticides and acaricides. In the food sector vitamins, mineral substances, etc. are suitable as substances, which can be delivered in delayed form by means of the redispersible powder. The inventive, redispersible powders can also be used in the pharmaceutical sector in the form of carrier materials for receiving random medicaments to be subsequently released.

The desired, improved characteristics of the dispersions according to the invention and the powders obtainable by drying are based on the fact that a polymer with cationic functionality in an emulsion polymerization process takes over partly or completely the function of a surfactant or protective colloid, independently of further functionalities in the molecule. It is not important whether the polymer with cationic functionality is present in homopolymerized or copolymerized form.

Numerous advantages result from the invention. Thus, with regards to the quantitative and qualitative framework conditions, the inventive processes A) and B) have a surprising flexibility compared with the aforementioned prior art. This is in each case only restricted by one condition: namely in process A) by the formation of the heterogeneous morphology and in process B) by the additional seed polymerization. Emulsifiers are not absolutely necessary according to the invention. Thus, the disadvantages associated with such stabilizing additives can be completely avoided. In fact any further stabilizing agents can be obviated. However, the process products obtained have very favourable properties, such as improved processability, better setting behaviour (adhesion), good water tightness and greater storage stability. A particular advantage is that the process product obtained leads to improved characteristics in the final applications. The planned control of the characteristics profiles of the substrates to be modified, i.e. the improved action due to the added particles increases in proportion to the fineness with which the particles can be added. By incorporating seed polymerization, it is possible to obtain in planned manner very homogeneous particles with monodisperse, very small particle diameters, which even comply with the high demands of chromatographic separation systems or calibrating materials. The inventive, redispersible powders can be used with particular advantage as inert carriers for many substances, e.g. in the agricultural, food and pharmaceutical sectors. These substances can consequently be more easily dosed and used in a more planned manner due to the delayed release. With particular advantage the three processes A) and B) according to the invention can in part be combined, so that the advantageous characteristics are correspondingly combined in a desired manner and can therefore be adjusted in planned manner individually for each application. An adaptation to the desired use can additionally be obtained by the choice of the glass transition temperature.

The invention is illustrated in greater detail hereinafter by examples, which are not intended to restrict the teaching according to the invention. Within the scope of the inventive disclosure, further examples are obvious to the expert.

The following abbreviations are used in the examples:

| | |
|---|---|
| MMA | Methyl methacrylate |
| BA | Butyl acrylate |
| MAPTAC | N-[3-trimethyl ammonium)propyl]-methyacrylamide chloride |
| DMAPMA | N-[3-(dimethylamino)-propyl]-methacrylamide |
| DMAPMA-epi | N,N-[(3-chloro-2-hydroxypropyl)-3-dimethyl ammonium propyl]methacrylamide chloride |
| AA | Acrylic acid |
| GMA | Glycidyl methacrylate |
| VEOVA ®-10 | Vinylester of Versatic 10 ® (VEOVA ® X is a trademark of Shell and stands for vinyl esters of carboxylic acids, also known as Versatic ® X-acids) |
| Triton ® | Rohm & Haas mark for a range of nonionic surfactants |
| TBHP-70 | Tert-butyl hydroperoxide, 70% in water, and |
| V-50 | 2,2'-azobis(2-amidinopropane)-dihydrochloride. |

Example 1

To a 2 liter glass reactor equipped with a stirrer and thermostat, were successively added 10.0 g of Triton® X-405, 0.6 g of sodium lauryl sulphate and 450 g of deionized water. 2.4 g of the subsequently used monomer mixture (in this example consisting of methyl methacrylate, acrylic acid, methacrylic acid and butyl acrylate) were placed first in the seed monomer. Subsequently scavenging took place with nitrogen and heating took place to 75° C., accompanied by stirring. One minute later 1.0 g of 2,2'-azobis(2-amidinopropane)-dihydrochloride (Wako Chemicals GmbH; hereinafter called V-50) was added in one portion. On reaching this temperature, dosing in simultaneously took place of 35.0 g of a 55% aqueous solution of N,N-[(3-chloro-2-hydroxypropyl)-3-dimethyl ammonium propyl]-methacrylamide chloride (hereinafter called DMAPMA-epi), together with 60.0 g of deionized water within 30 minutes. 30 minutes after the start of the aforementioned feeds, dosing in took place of 5.7 g of V-50, dissolved in 60 g of water over a 3.5 hour period. It was ensured that throughout the entire time the temperature was kept at between 74 and 76° C. 30 minutes after the start of polymerization, within a 3 hour period dosing in took place of a monomer mixture of 252 g of methyl methacrylate, 24 g of acrylic acid, 2.4 g of methacrylic acid and 252 g of butyl acrylate. When these feeds were ended, cooling took place to 35° C. The solids represented 49.6%, the viscosity 607 mPas and the pH-value 2.7.

Example 2

Example 1 was repeated, but the aqueous DMAPMA-epi solution was dosed in parallel with the monomer mixture of 252 g of methyl methacrylate, 24 g of acrylic acid, 2.4 g of methacrylic acid and 252 g of butyl acrylate. Coagulation occurred after 30 minutes of monomer feed.

Example 3

Example 1 was repeated, but 520 g of vinyl acetate, 25 g of acrylic acid and 2.5 g of methacrylic acid were dosed in as the monomer mixture over a 3 hour period. The example shows that the in situ polymerized colloid as a stabilizer is not only active in the case of acrylate-based comonomers in emulsion polymerization, but functions also with other monomers. The solids of this dispersion represented 49.5%, the viscosity was 96 mPas and the pH-value 2.7.

Example 4

Example 1 was repeated, but 380 g of vinyl acetate, 150 g of VEOVA® 10, 25 g of acrylic acid and 2.5 g of methacrylic acid as the monomer mixture were dosed in over a 3 hour period. The example shows that the in situ polymerized colloid is generally usable as a stabilizer in emulsion polymerization. The inventive stabilization is also obtained with the described monomer composition. The solids represented 49.4%, the viscosity was 173 mPas and the pH-value 2.7.

Example 5

Example 1 was repeated, but 220 g of styrene, 200 g of butyl acrylate, 40 g of acrylic acid and 10 g of glycidyl methacrylate were dosed in as the monomer mixture over a 3 hour period. The solids represented 46.1%, the viscosity was 95 mPas and the pH-value 2.8.

Example 6

Example 1 was repeated, but 35 g of a 50% aqueous solution of N-[3-(trimethyl ammonium)-propyl]-methacrylamide chloride (hereinafter called MAPTAC) was added in the first stage in place of DMAPMA-epi. The monomer MAPTAC, like DMAPMA-epi, has a quaternary ammonium group and can consequently also be used for the formation of an in situ prepared colloid, which acts as a latex stabilizer. The solids represented 50.5%, the viscosity was 497 mPas and the pH-value 2.5.

Example 7

To a 2 liter glass reactor, equipped with a stirring and thermostat, were successively added 13.6 g of dodecyl mercaptan, 1.0 g of sodium hydrogen carbonate and 660 g of deionized water were added to the reactor. This was followed by scavenging with nitrogen and heating to 60° C., accompanied by stirring. The aqueous monomer solution comprised 73.8 g MAPTAC and the one hour monomer feed 99.7 g of methyl methacrylate, 11.1 g of butyl acrylate and 36.9 g of VEOVA® 9. One minute later 1.3 g of V-50 was added in one portion. 15 minutes after the start of the above feeds, 4.9 g of V-50, dissolved in 15 g of water, were dosed in for three and a half hours. It was ensured that throughout the time the temperature remained between 79 and 81° C. 75 minutes after the start of polymerization, a mixture of 272 g of methyl methacrylate and 272 g of butyl acrylate was dosed in for two and a quarter hours. When all the feeds had ended, cooling took place to 60° C., dilution with 20 g of water and somewhat later further cooling to 30° C. and analysis of the dispersion. In this example working took place in emulsifier-free manner, i.e. the latex was stabilized solely by the cationic polymer (colloid) prepared in the first phase of polymerization. The solids represented 50%, the viscosity was 1560 mPas and the pH-value 4.6. The calculated Tg of the shell (25%) was about +70° C. and that of the core (75%) +4° C.

Example 8

Spray Drying Dispersions:

The dispersions of examples 6 and 7 were spray dried using conventional processes. Prior to spraying, dispersion 7 was mixed with 10 parts of partly hydrolyzed polyvinyl alcohol (degree of hydrolysis 88%; viscosity 4 mPas as 4% solution) to 90 parts dispersion. The solids proportion was adjusted to 25% with water and sprayed by means of a two-fluid nozzle. Air compressed to 4 bar was used as the spraying component. The droplets formed were dried with air at 110 to 115° C. in parallel flow. In both cases a free-flowing, redispersible powder was obtained.

The following use example shows the improved characteristics of the inventive dispersions and powders in cement-containing products.

Example 9

The following procedure was used for the use testing of the inventive polymer dispersions and powders.

A mortar mass with the following composition was prepared:

60.0 g of quartz sand according to DIN 1164, part 7 of particle group 0.1 to 0.3 mm, 35.0 g Portland cement CEM 52.5, 24.0 g water, 0.4 g cellulose (MB2000xp, Herkules) and 5.0 g of (co)polymerizate according to the invention.

Using the mortar composition above, various tests were carried out and the adhesive strength, wet storage and water resistance were determined. For evaluating the adhesive strength the draft of European standard CEN/prEN 1348 of October 1993 was used as a basis.

The following parameters were determined:

Adhesive Strength:

Use was made of 50 mm×50 mm clay tiles (EN 176). Following an insertion time within 5 min following application, loading took place with 20 N for 30 sec. The adhesion test took place after 28 days, stored at 50% relative atmospheric humidity and 23° C. (standard climate).

Wet Storage:

Use was made of 50 mm×50 mm clay tiles (EN 176). Following an insertion time within 5 min after application, loading took place with 20 N for 30 sec. The adhesion test took place after 7 days with standard climate and 20 days under water.

Water Resistance:

If the adhesive strength after wet storage is divided by the standard storage (dry storage), the resulting percentage represents the water resistance. The smaller the figure, the worse the water resistance.

The following tables I and II show the results obtained:
a) Results with the Aqueous Dispersion of Example 1:

TABLE I

| Copolymerizate | Processability | Adhesion Standard (N/mm$^2$) | Adhesion Wet storage (N/mm$^2$) | Wet/standard (%) |
|---|---|---|---|---|
| PVOH-stabilized MMA/BA | very good | 1.22 | 0.31 | 25.4 |
| Example 1 | very good | 1.26 | 1.13 | 89.7 |

This (co)polymerizate according to the invention prepared with in situ polymer with cationic functionality offers improved adhesion following wet storage.

b) Results for the Pulverulent Copolymerizate According to Example 6.

TABLE II

| Copolymerizate | Processability | Adhesion Standard (N/mm$^2$) | Adhesion Wet storage (N/mm$^2$) | Wet/standard (%) |
|---|---|---|---|---|
| PVOH-stabilized St/BA | very good | 1.63 | 0.62 | 38.3 |
| Powder of dispersion of Ex. 6 (Example 8) | very good | 1.10 | 0.80 | 72.7 |

Here again the (co)polymerizate according to the invention has an improved adhesion after wet storage.

Thus, the inventively modified mortars have an excellent adhesive strength on mineral substrates, particularly after wet storage. In addition, the thus modified adhesive mortars in the ready-to-use state have a very good processability, as is required by the processor.

What is claimed is:

1. A redispersible powder comprising a copolymer obtained by drying a stable aqueous dispersion, said aqueous dispersion comprising a copolymer having one or more reactive functional groups, said copolymer being polymerized from at least one cationic unsaturated monomer and at least one non-cationic unsaturated monomer, characterized in that the copolymer powder is redispersible in water.

2. The redispersible powder of claim 1, wherein said copolymer is polymerized in situ in the presence of a seed polymer.

3. The redispersible powder of claim 1 wherein the copolymer powder comprises particles having a heterogeneous morphology.

4. The redispersible powder of claim 3 wherein said particles have an average diametr of from 30 to 1000 nm.

5. The redispersible powder of claim 3 having a core-shell morphology comprising a hydrophilic inner phase and a hydrophobic outer phase.

6. The redispersible powder of claim 1 wherein said reactive functional groups are selected from the group consisting of hydroxyl, carboxyl, carboxyl ester, amino, ammonium, amide, silane, epoxide, carbonyl, formamide, acetamide, succinimide, epihalohydrin, and mixtures thereof.

7. The redispersible powder of claim 1 wherein said cationic functional monomer copolymer comprises 1 to 30 percent by weight of said copolymer.

8. The redispersible powder of claim 1 wherein said copolymer is formed from 10 to 100 percent by weight of monomers containing a reactive functional group.

9. The redispersible powder of claim 1 wherein said cationic-monomer comprises a quaternary ammonium group.

10. The redispersible powder of claim 1 wherein said reactive functional groups are activated following a redispersion by a change in the pH of the redispersion.

11. The redispersible powder of claim 1 wherein said reactive functional group comprises at least one protonated group which is deprotonated by raising the pH-value of the redispersion.

12. The redispersible powder of claim 1 wherein said non-cationic monomer comprises an anionic monomer.

13. The redispersible powder of claim 1 wherein said aqueous dispersion comprises less than 2.5% by weight of emulsifier.

14. The redispersible powder of claim 13 wherin said aqueous dispersion is free of emulsifier.

15. The redispersible powder of claim 1 wherein said drying is by spray or freeze drying.

16. The redispersible powder of claim 1 further comprising a redispersible powder of a second (co)polymer.

17. The redispersible powder of claim 16 wherein said second (co)polymer comprises monomers selected from vinyl acetate, ethylene, vinyl versatate, acrylate, methacrylate, styrene, butadiene and mixtures thereof.

18. An Aqueous dispersion comprising the redispersible powder of claim 1.

19. A process for preparing a redispersible powder comprising:

a) forming a (co)polymer having one or more reactive functional groups in an aqueous medium, said copolymer being polymerized from at least one cationic unsaturated monomer and at least one non-cationic unsaturated monomer to form an aqueous dispersion; and b) drying the aqueous dispersion.

* * * * *